Figure 1:
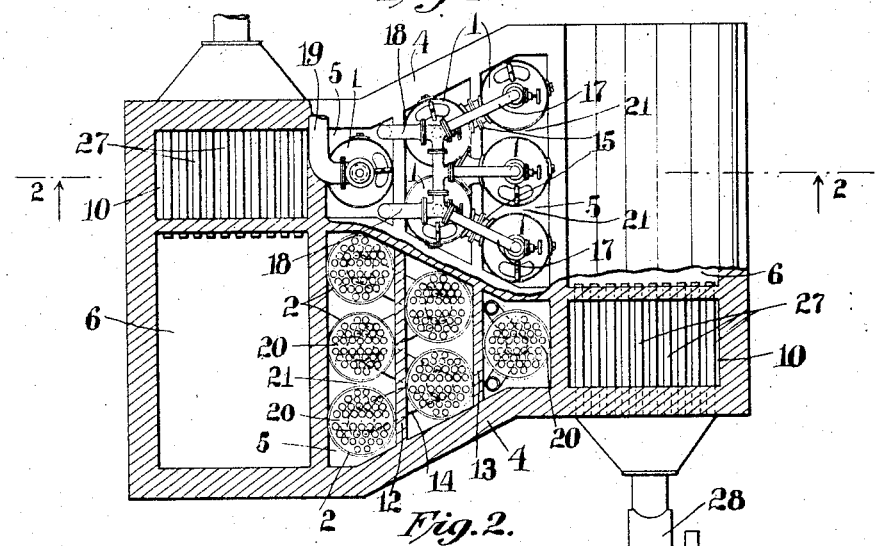

Attest:
Mitchell
Alfred M. Houghton

Inventor:
Carl C. Thomas
by Marble McElroy & Matty
Attys

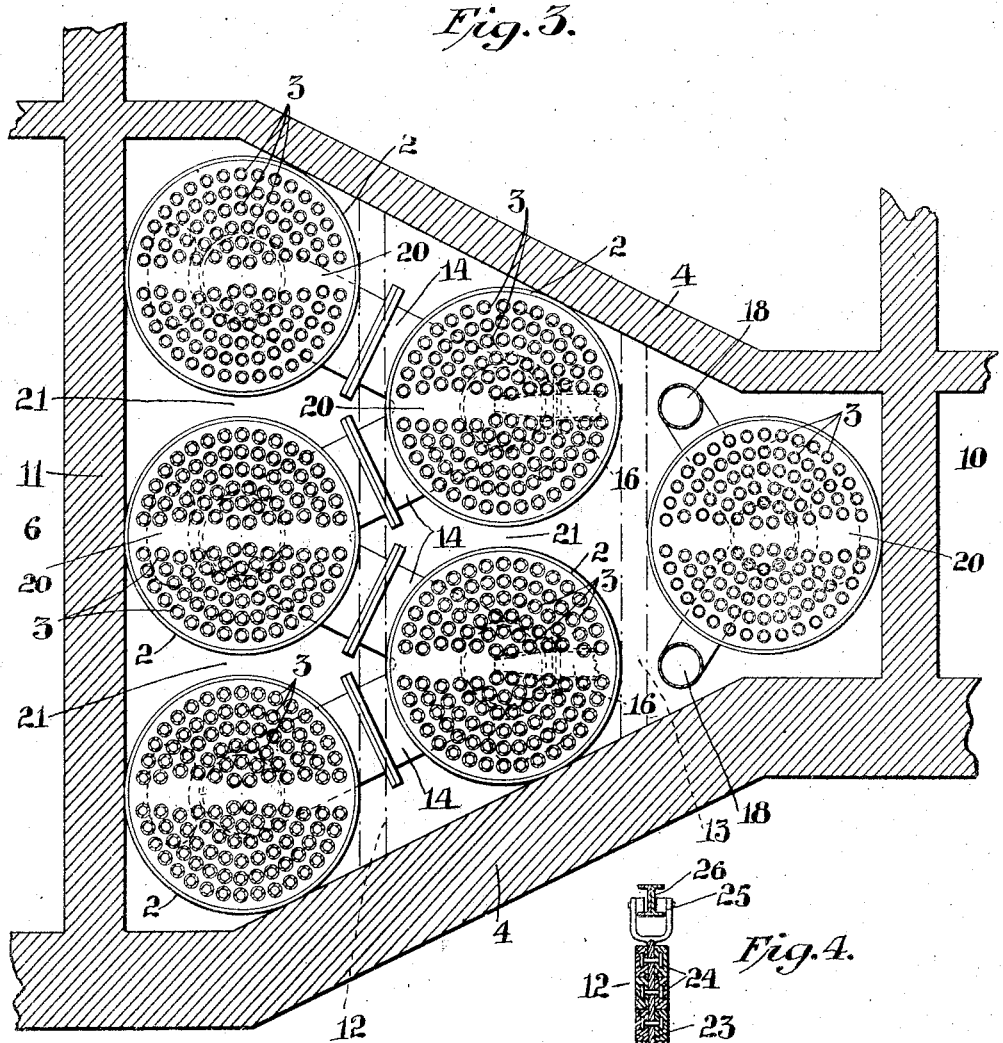

UNITED STATES PATENT OFFICE.

CARL C. THOMAS, OF ITHACA, NEW YORK.

STEAM-BOILER.

991,562.

Specification of Letters Patent. Patented May 9, 1911.

Application filed October 16, 1907. Serial No. 397,694.

*To all whom it may concern:*

Be it known that I, CARL C. THOMAS, a citizen of the United States, residing at Ithaca, in the county of Tompkins and State of New York, have invented certain new and useful Improvements in Steam-Boilers; and I do hereby declare the following to be a full, clear, and exact description of the same, such as will enable others skilled in the art to which it appertains to make and use the same.

My invention relates to steam boilers, and particularly to boilers of the water-tube type, and comprises an improved arrangement of parts whereby efficient natural circulation of water through generating tubes in opposition to the direction of flow of furnace gases past said tubes is insured; whereby ample opportunity for disengagement of the steam from the water is provided; whereby the furnace gases are distributed efficiently so as to be able to impart heat to the tubes to best advantage; whereby the steam may be superheated and ample opportunity given for separation of entrained moisture from the steam; whereby boilers may be arranged in pairs or groups with marked economy of space occupied; and whereby the air supplied the boiler may be heated by what is otherwise waste heat.

Other important advantages of the novel boiler structure and arrangement which constitutes my invention will be pointed out hereafter.

At the present time, the tendency of engineers having in charge the design of power plants or the like of large capacity, is, to produce the power by means of a few power units, (either turbines or reciprocating engines), of very large capacity, instead of by means of a larger number of relatively smaller units. For various practical reasons, it is desirable to supply steam to each of these large units by means of a single boiler, or, if necessary, group of boilers, allotted primarily to that particular power unit alone; and if a group of boilers must be used, it is desirable that there shall not be more than two boilers in the group.

These conditions call for an increase in steaming capacity of individual boilers corresponding to the increase in capacity of individual power units, which is difficult if not impossible to provide in many of the types of boiler heretofore commonly used. At the same time it is desired that the floor space occupied shall be as small as possible. Further, it is required that the steam shall be delivered from the boiler as dry as possible and, if possible, superheated to greater or less extent. I have found that, contrary to general opinion, steam which is somewhat superheated may not be dry, but may carry with it a considerable proportion of entrained water; the fact being that while such water is of course evaporating constantly so long as the steam remains superheated, such evaporation may be relatively slow owing to the relatively small difference of temperature between the water and the steam, owing to the relatively low heat conductivity of superheated steam and the relatively small mass of steam in intimate contact with any particular particle of the water, and other reasons which will occur to the engineer; and this slow evaporation may in fact hardly compensate for condensation due to absorption of heat by the walls of steam pipes, etc., if it does in fact actually so compensate. To insure the delivery of dry and truly superheated steam, therefore, it is not enough to supply the boiler with a superheater and to operate boiler and superheater so that, on test, the steam delivered shows a temperature higher than that corresponding to the pressure at which the steam is delivered; the construction of the boiler must be such that ample opportunity is given for separation of the steam from the water, and the superheater must be of ample capacity and so constructed and arranged with respect to the boiler that the steam passes through it slowly and that any water carried by the steam into the superheater tends to fall away from the steam outlet, rather than to fall toward such outlet. Heretofore, where superheaters have been provided, it has been the general custom to provide a relatively small superheater through which the steam is passed relatively rapidly; whereas I find that the reverse should be the case; that the superheater should be relatively large, and the velocity of the steam through it relatively small thereby permitting entrained water to settle or evaporate.

In the accompanying drawings I illustrate one type of boiler embodying my invention and possessing the desirable qualities above referred to and others hereafter pointed out.

It will be obvious that various modifications and changes may be made in the boiler as illustrated, without departing from the spirit and scope of the invention.

Figure 2:
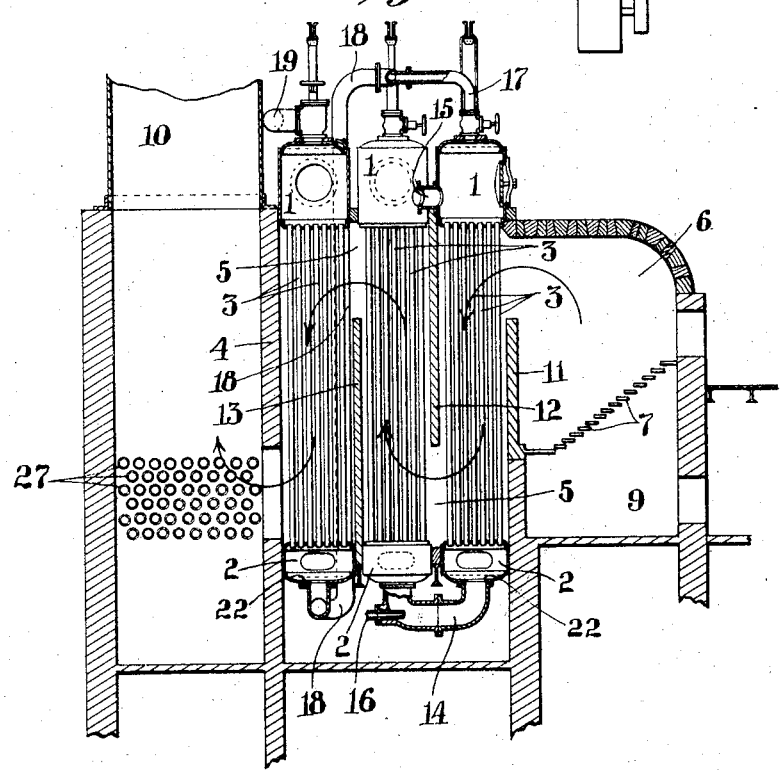

In said drawings: Figure 1 shows a top view and partial horizontal section of a boiler group comprising two similar boilers located oppositely but side to side. Fig. 2 shows a central vertical section, from front to rear, of one of the said boilers. Fig. 3 shows a horizontal section, on a scale larger than the preceding views, of a boiler such as shown in Figs. 1 and 2, and shows particularly the arrangement of the tubes of the different generating elements, the arrangement of the vertical baffles with respect to the generating elements, and the circulating connections at the lower ends of the generating elements. Fig. 4 is a detail vertical section of the front baffle, illustrating the construction and mounting thereof.

Each of the twin boilers herein illustrated consists of a plurality of generating elements each comprising an upper drum, a lower drum, generating tubes connecting said drums, and suitable steam and water connections; together with suitable walls, a furnace, offtake, baffles, etc. These generating elements are arranged vertically, or substantially so, and are arranged in a plurality of rows, or groups, of which the front row, or row next the furnace, preferably comprises the greatest number of the generating elements, and the last row (which in the boiler illustrated constitutes the superheater) comprises the least number, and in the boilers illustrated this last row consists of but one of said generating elements. The circulation of furnace gases is downward along and between the tubes of the first row of generating elements, thence under the first baffle and up along and between the tubes of the second row of generating elements, and thence over the second baffle and downward along and between the tubes of the last row or superheater, to the offtake. Owing to the fact that the space occupied by the generating elements so arranged is triangular, I commonly arrange the boilers in pairs, the boilers of each pair side by side but oppositely placed, so that the combustion chamber of each boiler is beside the stack of the other boiler. This arrangement of the boilers in pairs not only permits me to locate two boilers in little more than the rectangular space which would be required for one only, but it permits me to use the stack gases of each boiler for heating the air supplied to the furnace of the other boiler; air pipes or ducts leading transversely across and through the stack of each boiler into the space beneath the grate of the other boiler.

In the drawings, numerals 1 designate the upper drums, 2 the lower drums, 3 the tubes connecting said upper and lower drums, 4 the boiler setting, 5, 5, the chambers within said setting in which the generating elements are located, 6 the furnaces of said boilers, 7 the grates thereof, 9 the ash-pits thereof, and 10 the stacks thereof. Each sheaf of generating tubes 3 and the lower drum and upper drum which that sheaf connects, constitutes a generating element. In the construction shown each boiler comprises six such elements, though obviously the number might be greater without disturbing the relatively staggered arrangement of the elements and the generally triangular grouping thereof.

As indicated by arrows, the furnace gases pass from the combustion chamber of furnace 6, over bridge wall 11 across and hence downward and along and between the generating tubes of the first row of three generating elements; thence underneath vertical baffle 12 and across, up and along the generating tubes of the second row of two generating elements; and thence over vertical baffle 13 and across, downward and along the generating tubes of the superheater, being the last generating element, to the opening to the stack 10. Circulating connections 14 connect the lower drums 2 of the second row of generating elements with the drums 2 of the first row; and other circulating connections 15 connect the upper drums 1 of the second row with the corresponding drums 1 of the first row. Since the tubes 3 of the first row of elements are acted upon by the furnace gases before the tubes of the second row of elements are acted on by said gases, the tubes of the first row are heated the hottest, and therefore the direction of natural circulation of the water will be upward through the tubes of the first row of elements, and downward through the tubes of the second row of generating elements, so that, as will be noted, the direction of circulation of the water is directly opposite that of the passage of the furnace gases over the tubes—a condition favorable to high efficiency in transfer of heat. Owing to the relatively high temperature of the gases when in contact with the tubes of the first row of elements, as compared with the temperature of the gases in contact with the second row, the conversion of water into steam will be most rapid in the tubes of the first row of elements; and hence the specific gravity of the water, or mixture of water and steam, in the tubes of the first row will be materially less than that of the water, or water and steam, in the tubes of the second row, and hence the natural circulation in the direction stated will be extremely active. I stimulate this natural circulation, and at the same time mix the feed water with the main body of water in the boiler, by injecting the feed water into the mass of water flowing through the lower circulating connections, 14, by means of injector nozzles, 16, the feed water being injected by these nozzles in the direction of natural circulation.

The upper portions of the upper drums 1 of the first two rows constitute steam spaces; and from these drums 1 the steam is collected by pipes 17 and delivered to pipes 18 passing downward alongside the superheater and connected to the lower drum 2 of the superheater. The upper drum, 1, of the last generating element or superheater constitutes the steam dome and to it is connected the main steam delivery pipe 19. It will be noted that the direction of flow of the steam through the superheater is upward, while the direction of flow of the furnace gases along the tubes of the superheater is downward; therefore the hottest and dryest steam is heated by the hottest portion of the furnace gases passing along the superheater; this being a condition favoring the imparting of a maximum degree of superheat to the steam.

It will be noted that by providing a greater number of generating elements in the first row, where the furnace gases are hottest, than in the second row, ample opportunity for disengagement of steam from the water in the tubes of the first row is given, so that relatively little projection of water into the upper drums 1 of the first row should occur, while at the same time it is permissible to force the boiler harder than would be permissible if less ample disengaging space were provided. The water, or mixed water and steam, passing down the tubes of the second row of elements, is of greater density than the mixture of water and steam passing up through the tubes of the first row, and hence requires less area of cross-section of conduit. At the same time, the heating surface provided in this second row of generating elements is sufficient to abstract from the furnace gases all the heat that can be taken from said gases efficiently. The cross-section of conduit provided in the superheater being relatively large, as compared with superheaters commonly used heretofore in water-tube boilers, the flow of the steam up through the superheater is relatively slow, and entrained water tends to separate out and fall back; so that the steam should be absolutely dry before reaching the upper part of the superheater, and therefore should receive a considerable degree of superheat.

It will be noted that the area of cross-section of the gas-space through which the surface gases flow grows progressively smaller from front to rear, in approximate proportion to decrease of volume of said gases due to cooling so that as the temperature of the gases falls and their heating power diminishes they are concentrated so as to impart as great a proportion of their heat to the heating-surface of the boiler, and as small a portion of that heat to the walls of such space and other non-effective surfaces, as possible. This is another feature tending toward high efficiency.

When a sheaf of generating tubes is exposed to the direct action of furnace gases fresh from the combustion chamber, it commonly happens that the very front tubes of the sheaf receive an undue proportion of the heat, often so much so that they fill with dry or nearly dry steam, and hence burn out prematurely, while tubes at the rear of the sheaf receive less than their due proportion of the heat. To obviate this defect and equalize the distribution of the furnace gases to the tubes, I commonly omit one or more rows, from front to rear, of the tubes of each sheaf, leaving an unobstructed space 20 serving to convey the gases to the rear portion of the sheaf, from which space 20 the gases diffuse laterally, passing between and along tubes at the rear of the sheaf which otherwise would receive much less than their due proportion of the heating effect of the gases; and in so providing this space 20, I eliminate the tubes which would be the most apt to burn out. The omission of these tubes, so as to provide a distributing channel 20 for the gases, not only makes the boiler more durable, but raises the heating efficiency of the tubes of the sheaf as a whole.

The spaces 21 between the sheaves of tubes of the first row are also advantageous, owing to the fact that the sheaves of the second row are staggered with reference to the sheaves of the first row; for the furnace gases which pass directly through these spaces 21, pass under the first baffle, 12, and then encounter the central portions of the sheaves of the second row; so that the gases which pass through these spaces 21 without heating efficiently the tubes of the first row of generating elements, encounter the tubes of the second row of generating elements under conditions most favorable for efficient heating, and hence raise materially the heating efficiency of this second row of generating elements.

It will be noted that the tubes are all straight, which materially facilitates the cleaning of the tubes and the retubing of the boiler. Each generating element is suspended from its upper drum, 1, the lower end of the element being free, so that ample provision is made for expansion and contraction without strain upon parts under pressure. It will be noted that while the lower heads of the lower drums 2 are bulged, they have flattened places 22 where the circulating connections 14 are attached; these flattened portions making the heads more flexible than would be the case if no such flattened portions were provided, so that the heads can conform readily to slight inequalities of expansion of the different generating units.

The baffles 12 and 13 will commonly be erected outside of the boiler setting and slid into place bodily through openings in the side walls left for that purpose. Baffle 12, which is suspended from above, may consist of a metal plate 23 (Fig. 4) having tiles 24 of refractory material secured to its faces, and suspended from a hanger 25 arranged to slide on the flanges of channels 26.

The reversed arrangement of boilers in pairs, above referred to, and shown particularly in Fig. 1, greatly facilitates the heating of the air supplied to the furnaces. For so heating the air currents, I provide, across each stack 10, series of air-heating tubes 27 connecting with the ash-pit of the furnace of the companion boiler; the waste gases of each boiler therefore serving to heat the air supplied to the companion boiler. Air may be supplied to these tubes by means of a blower 28, or by any other convenient means.

Owing to the fact that in this boiler the superheater is exposed to the furnace gases only after they have become relatively cool, said superheater will have relatively long life, as compared with superheaters exposed to furnace gases fresh from the combustion chamber, or nearly so, according to common practice; at the same time, owing to the relatively large size of the superheater, its action will be efficient.

By constructing the boiler of a plurality of precisely similar generating elements, each in itself of moderate size, the boiler is made relatively easy to make and to erect, and its cost may be relatively low. The fact that the steam and water drums are themselves all of relatively moderate size also greatly facilitates erection, as well as transportation. It is obviously possible to construct boilers of widely differing capacity from generating elements of the same size, by employing more or less generating elements in each row; it being quite practicable to provide more than three elements in the first row and corresponding numbers of elements in the other rows. There may also be more than three rows of generating elements, the superheater being usually in the last row; and on the other hand, the superheater may be omitted, if so desired. Owing to the vertical arrangement of the generating elements, a long path may be provided for the gases, and large heating surface and therefore large steaming capacity may be provided, while occupying only relatively small floor area. It is practicable to regulate the length of the path for the gases, without increasing or decreasing the floor area occupied, by regulating the length of the generating tubes, and, therefore, the height of the boiler. The construction of the boiler as a whole is such as to permit it to be made of very large capacity without occupying large floor space, and therefore it is practicable to build the boiler in such sizes that a single boiler, or a single group of two boilers, can supply the steam needed by very large power units.

Customarily the drums will be provided with suitable manholes, to facilitate cleaning and retubing.

In constructing boilers of extremely large capacity one or more of the groups of generating elements may comprise a plurality of rows of such elements; the elements of the different rows of such group or groups being preferably, in such case, relatively staggered. That is to say, there may be, in front of the baffle 12, and constituting the first group of elements, a plurality of rows of generating elements, and similarly the group of generating elements between baffles 12 and 13 may also comprise a plurality of such elements. Ordinarily it will not be necessary to provide a plurality of rows of generating elements in the last group, or superheater, though this also may be done.

What I claim is:—

1. A steam boiler comprising a furnace, a heating chamber in connection therewith, a closed circulating system comprising upper and lower drums and generating tubes connecting them and arranged in a plurality of groups, said heating chamber contracting from front to rear and said tubes arranged within said chamber within a correspondingly-contracting figure, and baffles between groups of said tubes causing the furn gases to pass alternately up and down along tubes of different groups.

2. A steam boiler comprising a furnace, a heating chamber in connection therewith, a closed circulating system comprising upper and lower drums and generating tubes connecting them and passing through said heating chamber, said chamber contracting from front to rear, and baffles in said chamber.

3. A steam boiler comprising a furnace, a heating chamber in connection therewith, a closed circulating system comprising upper and lower drums and generating tubes connecting them and passing through said heating chamber, said chamber contracting from front to rear, and a superheater comprising upper and lower drums and tubes connecting them and corresponding generally to the drums and tubes comprised in the circulating system, and a conduit connecting the upper portion of the circulating system to the lower part of said superheater to convey steam to the superheater.

4. A steam boiler comprising a furnace, a heating chamber in connection therewith, a closed circulating system comprising upper and lower drums and generating tubes connecting them and passing through said heating chamber, said chamber contracting from front to rear, and a superheater comprising upper and lower drums and tubes connecting them and corresponding generally to the drums and tubes comprising the circulating system, said tubes located in the path of the furnace gases, and a conduit for conveying steam from the circulating system to said superheater.

5. A steam boiler comprising a furnace, a heating chamber in connection therewith and contracting from front to rear in approximate proportion to the shrinkage of the furnace gases while passing therethrough, and water and steam containing means comprising generating tubes passing through said chamber.

6. A steam boiler comprising an inclosure, a circulating system comprising upper and lower drums and tubes connecting them, there being a plurality of said lower drums, and comprising also circulating connections between the lower drums, and feed-water-introducing means connected to said circulating system and having discharge orifices directed toward said circulating connections and in the direction of normal circulation therethrough.

7. A steam boiler comprising an inclosure, generating elements therein arranged in groups one behind another, and each comprising an upper drum, a lower drum and tubes connecting them, circulating connections between the drums of different groups, certain of said connections provided with feed-introduction nozzles discharging into said connections in approximately the direction of normal circulation therethrough, and means for passing heating gases along the tubes of different groups successively.

8. A steam boiler comprising an inclosure, generating elements therein arranged in rows one behind the other, the number of elements in a row decreasing from front to rear and the elements of different rows staggered relatively, said inclosure correspondingly decreasing in width from front to rear, said elements each comprising an upper drum, a lower drum, and tubes connecting them, connections between the drums of different rows, and means for passing heating gases along the tubes of different rows successively.

9. A steam boiler comprising a furnace, a heating chamber, generating elements arranged in said chamber in a plurality of rows, one behind the other, the elements of one row staggered with reference to the elements of another row, and a baffle between said rows, said elements each comprising an upper drum, a lower drum, and tubes connecting them, one row of tubes from front to rear being omitted, in each such element, to provide a passage for the gases, and connections between the drums of different rows.

10. A steam boiler comprising an inclosure, generating elements arranged therein substantially triangularly, one of said elements constituting a superheater, the walls of said inclosure conforming to the arrangement of said elements and forming a space for the circulation of heating gases which contracts with contraction of said heating gases themselves due to cooling, and means for conveying to said superheater the steam produced in the other generating elements.

11. A steam boiler comprising a furnace, a heating chamber in connection therewith the width of which decreases from front to rear, and generating elements in said heating chamber arranged in a plurality of groups, one behind the other, the lateral space occupied by the several groups decreasing progressively in approximate proportion to the contraction of said chamber, and means for passing the furnace gases in heating relation to the several groups of heating elements, successively.

12. A steam boiler comprising a furnace, a heating chamber in connection therewith, baffles within said chamber, and generating elements between, in rear of and in front of said baffles, the baffles arranged to cause the furnace gases to pass downwardly along the first generating elements, then upwardly along the elements between said baffles, and then downwardly behind the rear baffle, said chamber contracting from front to rear in approximate proportion to the shrinkage of the furnace gases.

13. The combination of two boilers arranged side by side, and each comprising a furnace, and a heating chamber in connection therewith, and generating means in said chamber, said chamber having an offtake, said heating chambers contracting progressively from front to rear, the rear of one boiler opposite the front of the other.

14. The combination of two boilers arranged side by side, and each comprising a furnace, a tapering heating chamber, an offtake, and generating means in said chamber, the offtake of one boiler opposite the furnace of the other, and air-heating means extending through the offtake of the one boiler into the furnace of the other.

15. The combination of two boilers arranged side by side, and each comprising a furnace, a tapering heating chamber, an offtake, and generating means in said chamber, the offtake of each boiler opposite the furnace of the other, air-heating ducts in each such offtake connected to the furnace of the other boiler, and means for passing air through said ducts.

In testimony whereof I affix my signature, in the presence of two witnesses.

CARL C. THOMAS.

Witnesses:
SHERMAN PEER,
F. ANDREWS.